(12) United States Patent
Aoyagi

(10) Patent No.: US 10,978,935 B2
(45) Date of Patent: Apr. 13, 2021

(54) SWITCH POWER GENERATING MECHANISM AND SWITCH POWER GENERATING METHOD

(71) Applicant: ADAMANT NAMIKI PRECISION JEWEL CO., LTD., Tokyo (JP)

(72) Inventor: Tomohide Aoyagi, Tokyo (JP)

(73) Assignee: ADAMANT NAMIKI PRECISION JEWEL CO., LTD., Tokyo (JP)

( * ) Notice: Subject to any disclaimer, the term of this patent is extended or adjusted under 35 U.S.C. 154(b) by 337 days.

(21) Appl. No.: 15/998,954

(22) PCT Filed: Feb. 16, 2017

(86) PCT No.: PCT/JP2017/005791
§ 371 (c)(1),
(2) Date: Aug. 17, 2018

(87) PCT Pub. No.: WO2017/142048
PCT Pub. Date: Aug. 24, 2017

(65) Prior Publication Data
US 2020/0204042 A1    Jun. 25, 2020

(30) Foreign Application Priority Data
Feb. 18, 2016  (JP) .............. JP2016-029167

(51) Int. Cl.
*H02K 35/00* (2006.01)
*H02K 7/18* (2006.01)
*H02K 7/116* (2006.01)

(52) U.S. Cl.
CPC ......... *H02K 7/1853* (2013.01); *H02K 7/1163* (2013.01)

(58) Field of Classification Search
CPC .. H02K 7/1163; H02K 7/1876; H02K 7/1853; H02K 7/1892; H02K 35/00; H01H 2239/076
See application file for complete search history.

(56) References Cited

U.S. PATENT DOCUMENTS

| | | | | |
|---|---|---|---|---|
| 1,366,461 | A | * | 1/1921 | Johnson ............. F21L 13/08 362/192 |
| 2,437,675 | A | * | 3/1948 | Bardin ............... F21L 13/08 310/75 B |

(Continued)

FOREIGN PATENT DOCUMENTS

| | | |
|---|---|---|
| CN | 103141014 A | 6/2013 |
| DE | 389638 C | 2/1924 |

(Continued)

OTHER PUBLICATIONS

Europe Patent Office, "Search Report for European Patent Application No. 17753303.1," dated Sep. 24, 2019.

(Continued)

*Primary Examiner* — Dang D Le
(74) *Attorney, Agent, or Firm* — Manabu Kanesaka

(57) ABSTRACT

A switch power generating mechanism includes at least a first movable component, a second movable component, a first deforming component connected to the first movable component, and a power generator, wherein a pressing force is transmitted to the second movable component from the outside of the switch power generating mechanism to cause at least part of the first movable component and at least part of the second movable component to move in a connected manner and cause the first movable component to rotate by a fixed amount to deform the first deforming component by a fixed amount; and the deformation of the first deforming component is released once the first movable component has been caused to rotate by the fixed amount, and power (Continued)

generation is performed with power generated in the power generator due to the first movable component rotated by a fixed amount with the release from the deformation.

9 Claims, 4 Drawing Sheets

(56) References Cited

U.S. PATENT DOCUMENTS

| | | | | |
|---|---|---|---|---|
| 2,535,041 | A | * | 12/1950 | Clark .................. F21L 13/08 310/75 B |
| 2013/0175606 | A1 | | 7/2013 | Tsuneyoshi |
| 2013/0175806 | A1 | | 7/2013 | Tsuneyoshi |
| 2014/0191592 | A1 | | 7/2014 | Erdmann et al. |
| 2014/0353135 | A1 | | 12/2014 | Erdmann et al. |

FOREIGN PATENT DOCUMENTS

| | | |
|---|---|---|
| DE | 410641 C | 3/1925 |
| DE | 102013210650 A1 | 12/2014 |
| EP | 2795647 A1 | 10/2014 |
| JP | 5740897 B2 | 5/2015 |
| WO | 2013/085057 A1 | 6/2013 |

OTHER PUBLICATIONS

PCT/ISA/210, "International Search Report for International Application No. PCT/JP2017/005791" dated Apr. 18, 2017.

NPL: Energy Harvesting, [online], [Feb. 9, 2016], Internet <URL: https://www.enocean.com/jp/technology/energy-harvesting/>; EnOcean Self-Powered IoT.

China Patent Office, "Office Action for Chinese Patent Application No. 201780011700.2," dated Mar. 16, 2020.

* cited by examiner

SWITCH POWER GENERATING MECHANISM AND SWITCH POWER GENERATING METHOD

RELATED APPLICATIONS

The present application is National Phase of International Application No. PCT/JP2017/005791 filed Feb. 16, 2017, and claims priority from Japanese Application No. 2016-029167, filed Feb. 18, 2016, the disclosure of which is hereby incorporated by reference herein in its entirety.

TECHNICAL FIELD

The present invention relates to a switch power generating mechanism and a switch power generating method.

BACKGROUND ART

Attention has been drawn to environmental power generation of a self-power generation type (energy harvesting) that can generate power by utilizing weak kinetic energy (human power, vibration, pressure, heat, sunlight, etc.) existing in a familiar environment and conventionally discarded without being used.

Some electrical apparatuses and devices such as a light can control operation by remote control using a wireless communication device. A power source such as a dry battery is incorporated in a wireless switch for controlling this type of wireless communication device, and operation of the wireless communication device is controlled by power supplied from the power source.

Meanwhile, it is required to form a switch power generating mechanism that does not require work such as power source replacement or charging by generating power through environmental power generation and using the power to transmit operation instructions to various devices via wireless communication. Specifically, a switch power generating mechanism of a self-power generation type is realized, which can generate and provide power by a switching operation of a user without depending on a power source when a light-on or a light-off instruction is transmitted to an apparatus such as a light via wireless communication.

For example, a switch power generating mechanism described in Non-Patent Literature 1 generates power with kinetic energy of an operation to push a switch (switching operation) and transmits a light-on or a light-off instruction to a light via wireless communication.

CITATION LIST

Non Patent Literature

Non Patent Literature 1: Energy Harvesting, [online], [Feb. 9, 2016], Internet <URL: https://www.enocean.com/jp/technology/energy-harvesting/>

SUMMARY OF INVENTION

Technical Problem

An example of such a switch power generating mechanism is a configuration where a coil and a magnet are included with a voice coil further fixed and a magnet and a switch component connected to each other. When a user pushes this switch component, the magnet moves in the fixed voice coil, and kinetic energy generated by the movement of the magnet generates power. Thus, an amount of power generated is greatly influenced by a speed of the magnet moving in the voice coil, that is, a speed of pushing the switch component. More specifically, a power generation voltage is proportional to a speed at which magnetic flux in the voice coil changes with the movement of the magnet. In addition, power (W) can be expressed by the following equation, that is, $W=V^2/R$ (where V is voltage and R is resistance of a voice coil, respectively). Therefore, when a moving speed of a magnet in a voice coil (or a voice coil in a magnet) is slow, a power generation voltage is low, and it is difficult to generate sufficient power.

Furthermore, there are variations in speed at which a user pushes a switch, which causes variations in amount of power generation and inconstantly makes it difficult to secure a required amount of power.

The present invention has been made in view of the above problems, and an object of the present invention is to provide a switch power generating mechanism and a switch power generating method that can secure a constant amount of power generation even if operated with a force applied at a slow speed and perform a reliable switching operation.

Solution to Problem

The problem is solved by the present invention described below. More specifically, a switch power generating mechanism of the present invention comprises:
  a second movable component that rotates by a predetermined amount by transmission of a force from outside;
  a first movable component that rotates by a predetermined amount in conjunction with the second movable component by the rotation of the second movable component;
  a first deformable component that deforms by a predetermined amount by the rotation of the first movable component and is released from deformation when the first movable component rotates by a predetermined amount;
  a rotation transmission mechanism that transmits rotation of the first movable component by a predetermined amount by release from deformation of the first deformable component; and
  a generator that generates electricity for power generation by the transmitted rotation of the first movable component.

It is preferred that the switch power generating mechanism of the present invention comprise:
  a second deformable component that is connected to the second movable component, deforms by a predetermined amount when the second movable component rotates by the predetermined amount by transmission of a force from outside, and is released from deformation by canceling the transmission of the force;
  the second movable component that rotates by a predetermined amount in a reverse direction by release from deformation of the second deformable component;
  the first movable component that rotates by a predetermined amount in a reverse direction in conjunction with the second movable component by the rotation of the second movable component;
  the first deformable component that deforms by a predetermined amount by the rotation of the first movable component by a predetermined amount in the reverse direction and is released from deformation when the first movable component rotates by a predetermined amount;

a rotation transmission mechanism that transmits rotation of the first movable component in the reverse direction, and that transmits rotation when the first movable component rotates by a predetermined amount in a direction opposite to the reverse direction by release from the deformation of the first deformable component; and a generator that generates electricity for power generation by transmitting each of the rotations of the first movable component. In the present invention, it is preferred that components forming the switch power generating mechanism, excluding a part of the second movable component, be housed in a box. In this case, a part of the second movable component projects from the box.

A switch power generating method of the present invention has a configuration, wherein a switch power generating mechanism including: a first movable component, a second movable component, a first deformable component connected to the first movable component, and a generator, is used, a force is transmitted from outside the switch power generating mechanism to the second movable component, at least parts of the first and the second movable components interlock with each other, the first movable component rotates by a predetermined amount, and the first deformable component deforms by a predetermined amount, the first deformable component is released from deformation after the first movable component rotates by a predetermined amount, and the first movable component rotates by a predetermined amount by release from deformation, and this rotation of the first movable component by a predetermined amount is transmitted to the generator to cause the generator to generate electricity for power generation.

It is preferred that the switch power generating method of the present invention have a configuration, wherein a second deformable component is connected to the second movable component, the second movable component moves by a predetermined amount by the force, and the second deformable component deforms by a predetermined amount, the second deformable component is released from deformation by canceling transmission of the force, at least parts of the first and the second movable components interlock with each other, the first movable component rotates by a predetermined amount in a reverse direction, the first deformable component deforms by a predetermined amount, and the first deformable component is released from deformation after the first movable component rotates by a predetermined amount in a reverse direction, the first movable component rotates by a predetermined amount in a direction opposite to the reverse direction by release from the deformation of the first deformable component, and the rotation of the first movable component by a predetermined amount in a reverse direction is transmitted to the generator to cause the generator to generate electricity for power generation, and the rotation of the first movable component by a predetermined amount in a direction opposite to the reverse direction is transmitted to the generator to cause the generator to generate electricity for power generation.

It is preferred that the switch power generating method of the present invention have a configuration, wherein the first movable component is a gear with teeth formed on at least a part of a periphery of a transmission wheel and is pivotally and rotatably supported around a central axis, the second movable component is a sector gear with teeth formed on at least a part of a periphery of a fan-shaped transmission wheel and is pivotally and rotatably supported around a central axis, the first deformable component is a coil-shaped spring with one end connected to the central axis of the second movable component and the other end connected to a part excluding a center of the first movable component, the second deformable component is also a coil-shaped spring and is housed in a box with one end connected to a part excluding a center of the second movable component and the other end connected to the box, a first bevel gear is pivotally supported on the central axis of the first movable component and pivotally and rotatably supported in connection with the first movable component, a second bevel gear is fixed to a shaft of the generator, and the first and the second bevel gears are connected to engage their teeth with each other, the force is transmitted to the second movable component to cause the second movable component to rotate by the predetermined amount to move, a part excluding the center also moves by a predetermined amount, the second deformable component elongates by the predetermined amount to deform, and a positional energy due to an elastic force is accumulated in the second deformable component and retained by the force, the teeth of the first and the second movable components engage and interlock with each other, the first movable component rotates by the predetermined amount, a part excluding the center also rotates by a predetermined amount, the first deformable component elongates by the predetermined amount to deform, and a positional energy due to an elastic force is accumulated and retained in the first deformable component by the engagement among the teeth of the first and the second movable components, the engagement among the teeth of the first and the second movable components is released after the first movable component rotates by the predetermined amount, the first deformable component is released from deformation to cause a contraction, the first movable component rotates by a predetermined amount in a reverse direction, the first bevel gear also rotates, the second bevel gear interlocks to rotate, and the shaft rotates to cause the generator to generate electricity for power generation, the second deformable component is released from deformation by canceling the transmission of the force to cause a contraction, the second movable component rotates by a predetermined amount in a reverse direction, the teeth of the first and the second movable components engage and interlock with each other, the first movable component rotates by the predetermined amount in the reverse direction, the part excluding the center also rotates by a predetermined amount in a reverse direction, the first deformable component elongates by a predetermined amount to deform, a positional energy due to an elastic force is accumulated in the first deformable component, the first bevel gear also rotates, the second bevel gear interlocks to rotate, and the shaft rotates to cause the generator to generate electricity for power generation, and furthermore, the engagement among the teeth of the first and the second movable components is released after the first movable component rotates by the predetermined amount in the reverse direction, the first deformable component is released from deformation to cause a contraction, the first movable component rotates by a predetermined amount, the first bevel gear also rotates and the second bevel gear interlocks to rotate, and the shaft rotates to cause the generator to generate electricity for power generation.

Advantageous Effects of Invention

According to the present invention, by including a first deformable component, it is possible to generate power by a generator by accumulating a deformation amount of the first deformable component to a predetermined amount and then releasing the deformation. Thus, even if a second movable component is pushed with a force applied at a slow speed to operate a switch power generating mechanism, a constant amount of power generation can be secured, and a reliable switching operation can be performed.

In addition, by including a second deformable component, the present invention makes it possible to generate power by the generator by accumulating a deformation amount of the second deformable component to a predetermined amount and then releasing the deformation. Thus, even if a second movable component is pushed with a force applied at a slow speed to operate a switch power generating mechanism, a constant amount of power generation can be secured, and a reliable switching operation can be performed.

Further, in the present invention, the second deformable component is released from deformation by canceling transmission of a force to the second movable component. In other words, even when the second movable component is not pushed, the switch power generating mechanism can secure a constant amount of power generation. Thus, since it is possible to increase an operating state capable of self-power generation, a more reliable switching operation can be realized, and use applications of the switch power generating mechanism can be expanded.

Furthermore, in the present invention, by configuring the first and the second movable components as gears and using these gears as components for forming the switch power generating mechanism, it is possible to engage their teeth with each other to operate the switch power generating mechanism. Thus, since it is possible to suppress or prevent occurrence of an operation loss, it is possible to reliably ensure a constant amount of power generation in any usage condition and perform a reliable switching operation, which is preferred.

Further, in the present invention, the switch power generating mechanism includes only simple components such as a gear, a coil-shaped spring, and a generator described above. Thus, it is possible to form a switch power generating mechanism excellent in weather resistance and reliability and capable of reliably ensuring a constant amount of power generation in any usage condition and performing a reliable switching operation.

Furthermore, in the present invention, by housing the components forming the switch power generating mechanism, excluding a part of the second movable component, in a box, dustproofness and waterproofness of a transmission part between the first and the second movable components can be secured. A rust preventive effect of a gear part can also be obtained. Thus, the weather resistance and the reliability of the switch power generating mechanism can be further improved, and a more reliable switching operation can be realized.

DESCRIPTION OF EMBODIMENTS

Figure 1A:
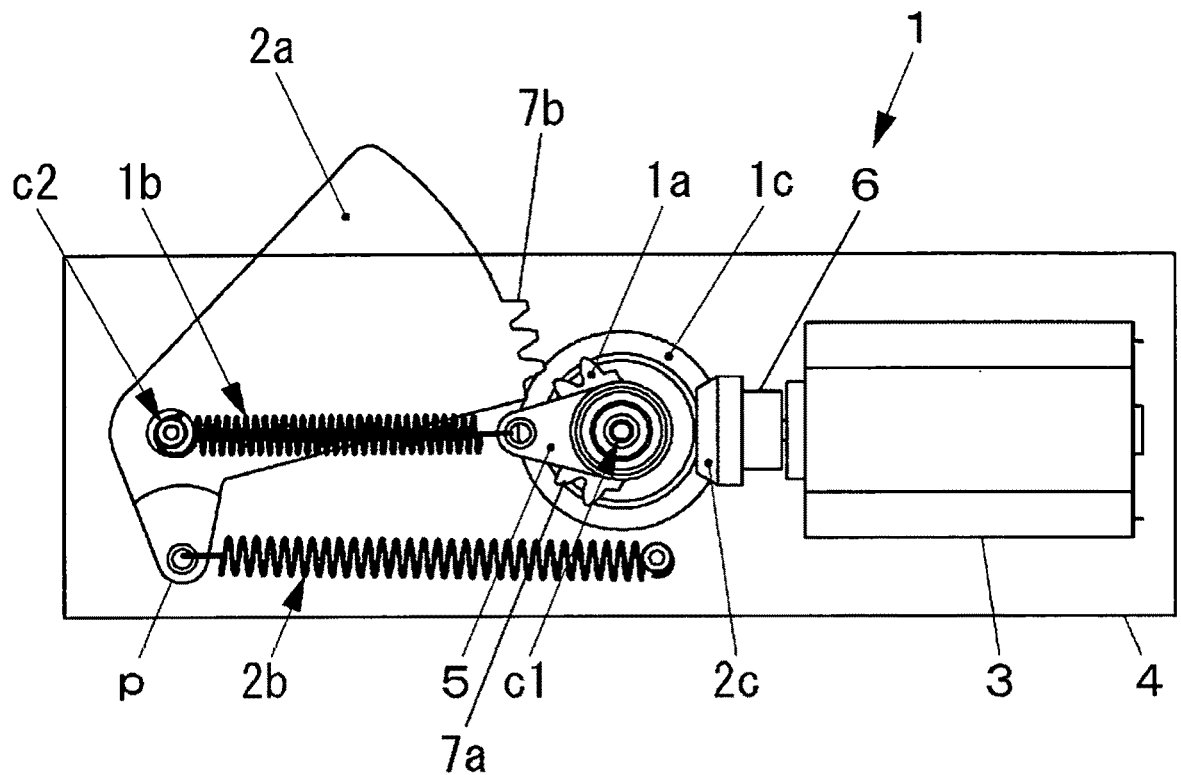
FIG. 1A is a schematic diagram that illustrates an initial state of a switch power generating mechanism according to an example of the present invention.
Figure 1B:
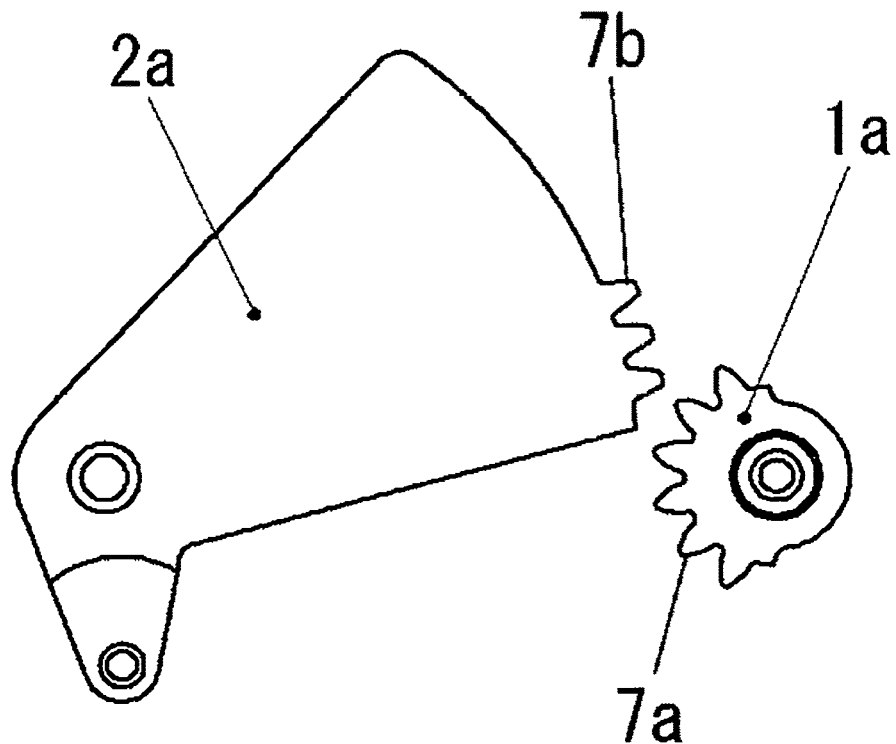
FIG. 1B is a schematic diagram that illustrates only a first movable component and a second movable component extracted from FIG. 1A.

A first feature of the present embodiment is as follows. In brief, a switch power generating mechanism generates power by a switching operation without a power source. The switch power generating mechanism includes at least a first movable component, a second movable component, a first deformable component connected to the first movable component, and a generator. The switch power generating mechanism of the present embodiment has a configuration, wherein a force (pressing force) is transmitted from outside to the second movable component, at least parts of the first and the second movable components interlock with each other, the first movable component rotates by a predetermined amount, the first deformable component deforms by a predetermined amount, the first deformable component is released from deformation after the first movable component rotates by a predetermined amount, the first movable component rotates by a predetermined amount by release from deformation, and this causes the generator to generate electricity for power generation.

With this configuration, it is possible to generate power by the generator by accumulating a deformation amount of the first deformable component to a predetermined amount and then releasing the deformation to rotate the first movable component by a predetermined amount. Thus, even if a second movable component is pushed with a force applied at a slow speed to operate a switch power generating mechanism, a constant amount of power generation can be secured, and a reliable switching operation can be performed.

In the present invention, a generator refers to a device that includes at least a coil and a magnet and generates electricity for power generation.

A second feature of the present embodiment is as follows. In short, the switch power generating mechanism has a configuration, wherein the second deformable component is connected to the second movable component, and the second movable component moves by a predetermined amount by a pressing force, and the second deformable component deforms by a predetermined amount. The second deformable component is released from deformation by canceling transmission of the pressing force, at least parts of the first and the second movable components interlock with each other, the first movable component rotates by a predetermined amount in a reverse direction to cause the first deformable component to deform by a predetermined amount, and the first deformable component is released from deformation after the first movable component rotates by a predetermined amount in a reverse direction. Then, by the rotation of the first movable component by a predetermined amount in a reverse direction and by the rotation of the first movable component by a predetermined amount by the release from deformation of the first deformable component, the generator generates electricity for power generation.

With the configuration of the present embodiment, by including the second deformable component besides the first deformable component, it is possible to generate power by the generator by accumulating a deformation amount of the second deformable component to a predetermined amount and then releasing the deformation. Thus, even if a second movable component is pushed with a force applied at a slow speed to operate a switch power generating mechanism, a constant amount of power generation can be secured, and a reliable switching operation can be performed.

Further, the second deformable component is released from deformation by canceling transmission of a pressing force to the second movable component. In other words, even when the second movable component is not pushed, the switch power generating mechanism can secure a constant amount of power generation. Thus, since it is possible to increase an operating state capable of self-power generation, a more reliable switching operation can be realized, and use applications of the switch power generating mechanism can be expanded.

In the present invention, a "predetermined amount" in rotation amount of the first or the second movable component, or in deformation amount of the first or the second deformable component does not always mean an identical amount of rotation or deformation. A rotation amount of the first or the second movable component and a deformation amount of the first or the second deformable component are not always constant at all times of operation and may be different, and may also be different depending on a direction of rotation. The "predetermined amount" also includes cases where such amounts of rotation and deformation are different.

A third feature of the present embodiment is as follows. Specifically, the first movable component is a gear with teeth formed on at least a part of a periphery of a transmission wheel and is pivotally and rotatably supported around a central axis. The second movable component is a sector gear with teeth formed on at least a part of a periphery of a fan-shaped transmission wheel and is pivotally and rotatably supported around a central axis. The first deformable component is a coil-shaped spring with one end connected to the central axis of the second movable component and the other end connected to a part excluding the center of the first movable component. The second deformable component is also a coil-shaped spring and is housed in a box with one end connected to a part excluding a center of the second movable component and the other end connected to the box. A first bevel gear is pivotally supported on the central axis of the first movable component and pivotally and rotatably supported in connection with the first movable component. A second bevel gear is fixed to a shaft of the generator. In the present embodiment, the first and the second bevel gears are connected to engage their teeth with each other. A pressing force is transmitted to the second movable component to cause the second movable component to rotate by a predetermined amount to move, a part excluding a center moves by a predetermined amount. The second deformable component elongates by a predetermined amount to deform, and a positional energy due to an elastic force is accumulated in the second deformable component and retained by the pressing force. In the present embodiment, the teeth of the first and the second movable components engage and interlock with each other. The first movable component rotates by a predetermined amount, and the part excluding the center also rotates by a predetermined amount. The first deformable component elongates by a predetermined amount to deform. A positional energy due to an elastic force is accumulated and retained in the first deformable component by the engagement among the teeth of the first and the second movable components. The engagement among the teeth of the first and the second movable components is released after the first movable component rotates by a predetermined amount. The first deformable component is released from deformation to cause a contraction, and the first movable component rotates by a predetermined amount in a reverse direction, whereby the first bevel gear rotates. With the rotation of the first bevel gear, the second bevel gear engaging with this first bevel gear interlocks to rotate, whereby the shaft rotates, and the generator generates electricity for power generation. Further, the second deformable component is released from deformation to cause a contraction by canceling the transmission of the pressing force, and the second movable component rotates by a predetermined amount in a reverse direction. The teeth of the first and the second movable components engage and interlock with each other, and the first movable component rotates by a predetermined amount in a reverse direction, so that the part excluding a center rotates by a predetermined amount in a reverse direction. Consequently, the first deformable component elongates by a predetermined amount to deform, and a positional energy due to an elastic force is accumulated in the first deformable component. The first bevel gear rotates, and the second bevel gear interlocks to rotate. The shaft rotates to cause the generator to generate electricity for power generation. Furthermore, after the first movable component rotates by a predetermined amount in the reverse direction, the engagement among the teeth of the first and the second movable components is released. The first deformable component is released from deformation to cause a contraction, and the first movable component rotates by a predetermined amount. The first bevel gear also rotates, and the second bevel gear interlocks to rotate. The shaft rotates to cause the generator to generate electricity for power generation.

With the configuration, by using the first movable component with teeth formed on at least a part of the periphery of the transmission wheel and the second movable component with teeth formed on at least a part of the periphery of the fan-shaped transmission wheel as components for forming the switch power generating mechanism, it is possible to engage their teeth with each other to operate the switch power generating mechanism. Thus, since it is possible to suppress or prevent occurrence of an operation loss, it is possible to reliably ensure a constant amount of power generation in any usage condition and perform a reliable switching operation, which is preferred.

Furthermore, the switch power generating mechanism of the present embodiment includes only simple components such as a gear, a coil-shaped spring, and a generator. Thus, it is possible to form a switch power generating mechanism excellent in weather resistance and reliability and capable of reliably ensuring a constant amount of power generation in any usage condition and performing a reliable switching operation.

A connecting position at one end of the first deformable component may be changed to an arbitrary part within the switch power generating mechanism such as a box.

A fourth feature of the present embodiment is that the components forming the switch power generating mechanism, excluding a part of the second movable component, are housed in the box.

According to the present embodiment, by housing the components forming the switch power generating mechanism, excluding a part of the second movable component, in the box, dustproofness and waterproofness of a transmission part between the first and the second movable components can be secured. A rust preventive effect of a gear part can also be obtained. Thus, the weather resistance and the reliability of the switch power generating mechanism can be further improved, and a more reliable switching operation can be realized.

The switch power generating mechanism can be used for an apparatus such as a light and a shutter.

Examples according to the present invention will be described below, but the present invention is not limited to the examples.

EXAMPLES

Hereinafter, a switch power generating mechanism 1 according to an example of the present invention will be described with reference to FIGS. 1A, B to FIGS. 4A, B. As illustrated in FIG. 1A, the switch power generating mechanism 1 of the example includes components such as a first movable component 1*a*, a second movable component 2*a*, a first deformable component 1*b*, a second deformable component 2*b*, a first bevel gear 1*c*, a second bevel gear 2*c*, and a generator 3. Further, each of the components is housed in a box 4, and a part of the second movable component 2*a* projects outside the box 4. In the present embodiment, an upper surface direction of the box 4 is referred to as "upper", and a lower surface direction of the box 4 is referred to as "lower". A part of the second movable component 2*a* projects above an upper surface of the box 4 to form a projection and is exposed outside. The second movable component 2*a* is configured to rotate by a predetermined amount by applying a force (pressing force) from outside to push the projection downward. Although not specifically illustrated, an opening is provided on the upper surface of the box 4, so that a part of the second movable component 2*a* can project above the upper surface of the box 4.

The first movable component 1*a* is a gear with teeth 7*a* formed on at least a part of a periphery of a transmission wheel and is pivotally and rotatably supported on a central axis c1 provided in the box 4. The second movable component 2*a* is a sector gear with teeth 7*b* formed on at least a part of a periphery of a fan-shaped transmission wheel and is pivotally and rotatably supported on a central axis c2 provided at a different part of the box 4.

Tooth forms of the first and the second movable components 1*a* and 2*a* are both an involute tooth form in the example. An involute tooth form properly maintains engagement even if a center distance between the gears (linear distance between the central axes c1 and c2) slightly changes and makes it possible to easily manufacture with a small slip, which is preferred. It is also possible to form a cycloid tooth form instead of the involute tooth form.

Materials of the first and the second movable components 1*a* and 2*a* can be arbitrarily selected, and for example, plastic, stainless steel, or steel may be used.

The first deformable component 1*b* includes a coil-shaped spring with one end thereof connected to the central axis c2 of the second movable component 2*a* and the other end connected to a part excluding a center of the first movable component 1*a*. In the example, the other end of the first deformable component 1*b* is locked and connected to a hole at an end of a holder 5 provided as one component of the first movable component 1*a*. The holder 5 is fixed to the central axis c1 of the first movable component 1*a* and pivotally and rotatably supported in conjunction with the first movable component 1*a*.

Further, the second deformable component 2*b* also includes a coil-shaped spring with one end thereof connected to a part excluding a center of the second movable component 2*a*. In the example, a hole is provided in a protrusion p projecting from the fan shape which is an outer shape of the second movable component 2*a*, and one end of the second deformable component 2*b* is locked and connected to the hole. In addition, the other end of the second deformable component 2*b* is connected to the box 4.

Furthermore, the first bevel gear 1*c* is fixed to the central axis c1 of the first movable component 1*a* and pivotally and rotatably supported in connection with the first movable component 1*a*. On the other hand, the second bevel gear 2*c* is fixed to an end of a shaft 6 of the generator 3 and configured to be rotatable in connection with the shaft 6. In addition, the first and the second bevel gears 1*c* and 2*c* are connected, so that their teeth engage with each other. In FIGS. 1A, B to FIGS. 4A, B, illustrations of the tooth forms of the first and the second bevel gears 1*c* and 2*c* are omitted.

The generator 3 is a motor including at least a coil and a magnet inside a housing and is of a type that either a coil or a magnet rotates with rotation of a shaft.

Next, an operating principle of self-power generation in the switch power generating mechanism 1 will be described. A force called a pressing force by human power or a pressing force from an object for each use application is transmitted from outside the switch power generating mechanism 1 to a part (projection) of the second movable component 2*a* projecting outside the box 4, and the second movable component 2*a* is pushed to rotate by a predetermined amount in a clockwise direction (see FIGS. 1A, B and FIGS. 2A, B). Thus, the second movable component 2*a* functions as a switch part and moves by a switching operation. The linear distance between the central axes c1 and c2 is set, so that the teeth of the first and the second movable components 1*a* and 2*a* engage with each other. Thus, when the second movable component 2*a* rotates, the teeth 7*a* of the first movable component 1*a* and the teeth 7*b* of the second movable component 2*a* engage and interlock with each other.

While a force (pressing force) continues to be transmitted to the second movable component 2a and the teeth of the first and the second movable components 1a and 2a engage with each other, the first movable component 1a continues to rotate. Therefore, the first movable component 1a rotates by a predetermined amount until the engagement among the teeth of the first and the second movable components 1a and 2a is released (in a case of the example, rotation of about 90° in a counterclockwise direction).

With the rotation of the first movable component 1a by a predetermined amount, the holder 5 also rotates in conjunction with the first movable component 1a. Thus, the hole at the end of the holder 5 also rotates by about 90°, and a position of the hole rotates to move. On the other hand, one end of the first deformable component 1b is connected to the central axis c2 of the second movable component 2a. Therefore, even if the second movable component 2a rotates, a connecting position does not move. Thus, the central axis c2 serves as a fixed end, and the first deformable component 1b elongates with the movement of the hole at the end of the holder 5. Since the hole at the end of the holder 5 rotates by about 90° as a predetermined amount, the first deformable component 1b also elongates and deforms only by a predetermined amount with the rotation of about 90°. The elongation of the first deformable component 1b is accumulated and retained in the first deformable component 1b as a positional energy due to an elastic force by the engagement among the teeth of the first and the second movable components 1a and 2a.

The elongation of the first deformable component 1b is retained while a force is continuously transmitted to the second movable component 2a and the teeth of the first and the second movable components 1a and 2a engage with each other Thus, the elongation of the first deformable component 1b reaches its maximum amount just before the engagement among the teeth of the first and the second movable components 1a and 2a is released. In the example, the elongation reaches its peak when the first movable component 1a and the holder 5 rotate by about 90°.

Figure 2A:
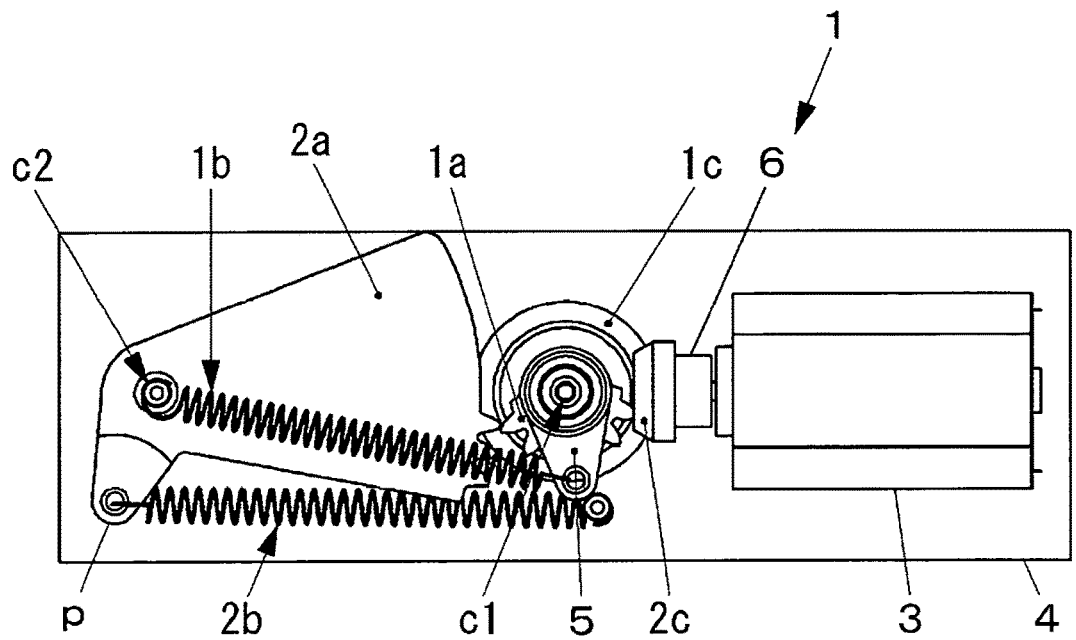
FIG. 2A is a schematic diagram that illustrates a state in which the second movable component is pushed and a first deformable component is deformed by a maximum amount in the switch power generating mechanism according to the example of the present invention.
Figure 2B:
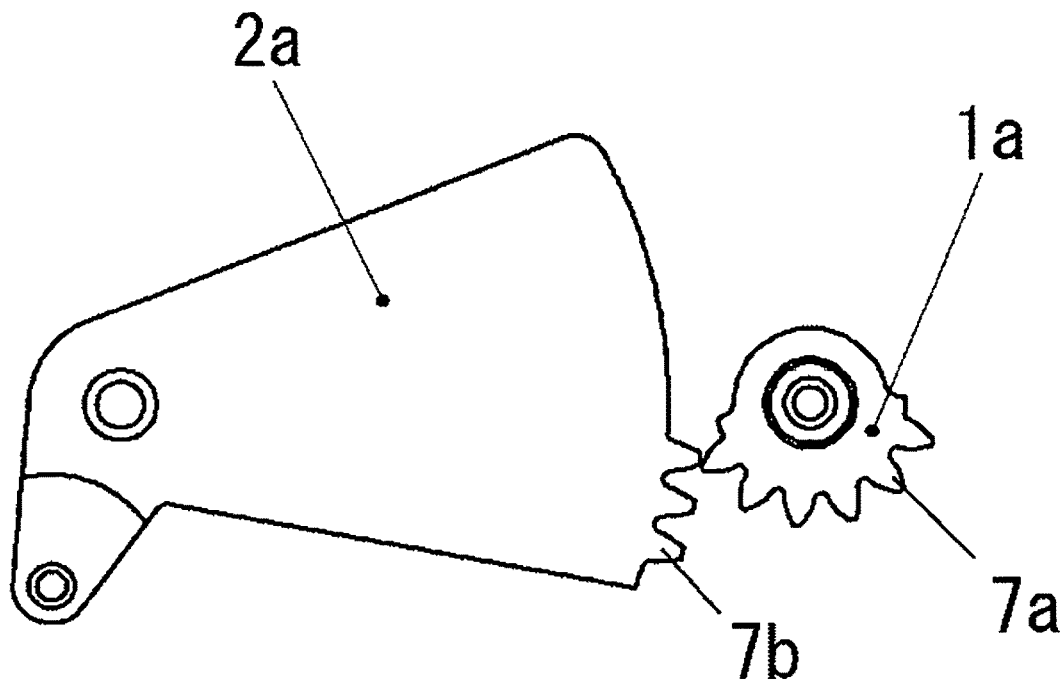
FIG. 2B is a schematic diagram that illustrates only the first and the second movable components extracted from FIG. 2A.
Figure 3A:
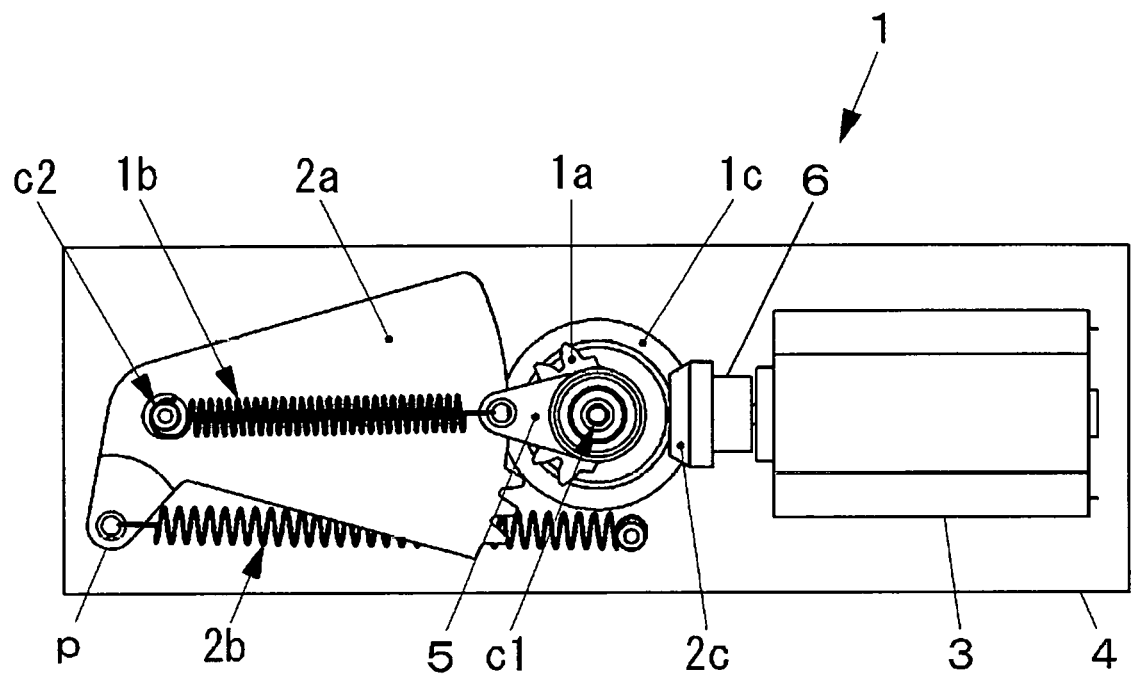
FIG. 3A is a schematic diagram that illustrates a state in which the first deformable component is released from deformation in the switch power generating mechanism according to the example of the present invention.
Figure 3B:
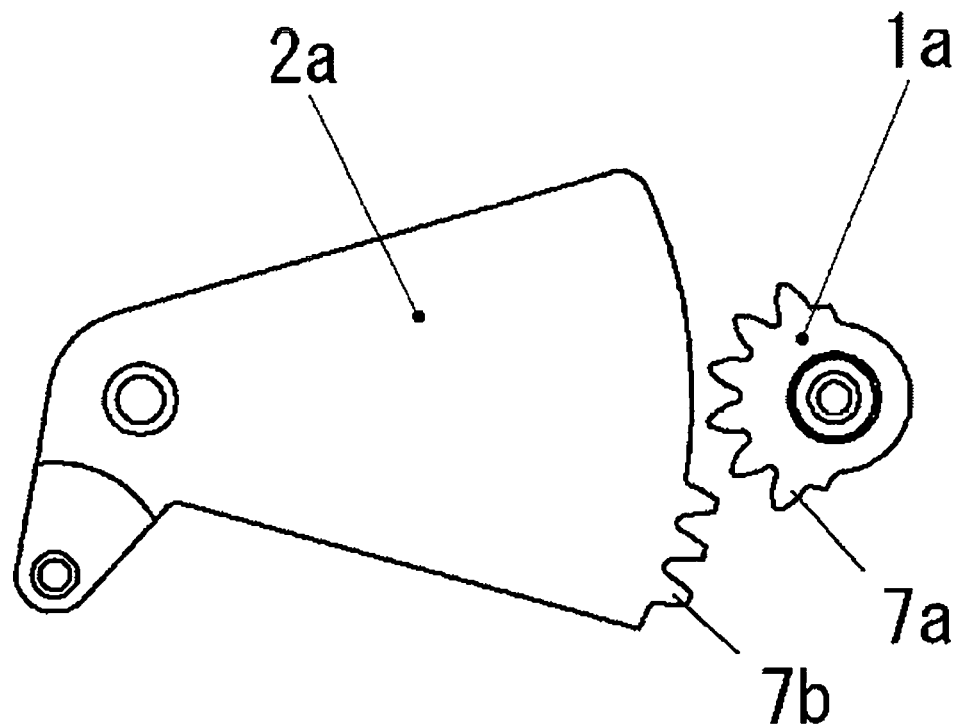
FIG. 3B is a schematic diagram that illustrates only the first and the second movable components extracted from FIG. 3A.

After the first movable component 1a rotates by a predetermined amount (about 90°), the engagement among the first and the second movable components 1a and 2a is released as illustrated in FIGS. 2A, B. Then, the retention of the deformation due to the elongation of the first deformable component 1b is released, and the first deformable component 1b is released from deformation to cause a contraction therein. Even during the contraction of the first deformable component 1b, the central axis c2 serves as a fixed end, and the hole at the end of the holder 5 moves. Thus, due to the contraction of the first deformable component 1b, the first movable component 1a rotates in a reverse direction (in the example, rotation of about 90° in the clockwise direction, see FIGS. 2A, B and FIGS. 3A, B) by a predetermined amount. A maximum value of the positional energy accumulated in the first deformable component 1b due to the elongation is a positional energy generated from the elongation of the first movable component 1a at the time of rotation of about 90°. This maximum value of the positional energy is converted by the contraction into rotation of the first movable component 1a by a predetermined amount (about 90°) in the reverse direction.

With the rotation of the first movable component 1a by a predetermined amount in the reverse direction, the first bevel gear 1c also rotates only by a predetermined amount in the reverse direction, and the second bevel gear 2c also interlocks to rotate. The shaft 6 rotates only by a predetermined amount. In other words, the rotation of the first movable component 1a is transmitted to a rotation transmission mechanism consisting of the first and the second bevel gears 1c and 2c, and the shaft 6 rotates by a predetermined amount. Thus, the rotation of the first movable component 1a is transmitted to the shaft 6, which causes the shaft 6 to rotate by a predetermined amount.

The rotation of the shaft 6 by a predetermined amount generates electricity inside the generator 3 for power generation. The electricity makes it possible to activate a wireless communication device such as infrared rays which can be arbitrarily installed separately according to an application of the switch power generating mechanism 1.

A rotation amount of the shaft 6 changes according to a rotation amount of the first movable component 1a in the reverse direction, that is, a maximum value of the elongation of the first deformable component 1b. Therefore, a maximum value of the elongation of the first deformable component 1b can be set to an arbitrary predetermined amount according to an arc length of a pitch circle where the teeth of the first and the second movable components 1a and 2a engage with each other. Thus, the rotation amount of the shaft 6 can also be set to an arbitrary predetermined amount, and therefore, the amount of power generation by the generator 3 can also be set at a constant value irrespective of a speed of an external force (pressing force) transmitted to the second movable component 2a. In the present embodiment, a rotation transmission mechanism is not limited to one including the first and the second bevel gears 1c and 2c and may include, for example, a spur gear consisting of a pair of gears mutually engaged and mounted on two parallel shafts.

As described above, the switch power generating mechanism 1 makes it possible, by including the first deformable component 1b, to generate power by the generator 3 by accumulating a deformation amount of the first deformable component 1b to a predetermined amount and then releasing the deformation. Thus, even if the second movable component 2a is pushed with a force applied at a slow speed to operate the switch power generating mechanism 1, a constant amount of power generation can be secured, and a reliable switching operation can be performed.

Further, the operating principle of self-power generation in the switch power generating mechanism 1 will be further described. As the force from outside continues to be transmitted, the second movable component 2a rotates to a predetermined amount. Rotation of the second movable component 2a by a predetermined amount is rotation at least until deformation due to elongation occurs in the second deformable component 2b and a rotation amount at least until the engagement among the teeth of the first and the second movable components 1a and 2a is released (see FIGS. 2A, B and FIGS. 3A, B).

When the second movable component 2a rotates by a predetermined amount to move, the protrusion p which is a part excluding the center of the second movable component 2a also moves by a predetermined amount, and a position of the hole moves. Then, a connecting portion in the box 4 serves as a fixed end, and the hole of the protrusion p serves as a moving end. With the movement of the hole, the second deformable component 2b elongates to deform.

With the rotation of the second movable component 2a by a predetermined amount, the hole of the protrusion p also moves by a predetermined amount. Therefore, the second deformable component 2b also elongates and deforms only by a predetermined amount according to a moving distance of the hole. Since the elongation of the second deformable component 2b is retained while a pressing force from outside is transmitted to the second movable component 2*a*, a positional energy due to an elastic force is accumulated and retained in the second deformable component 2*b*.

Next, when the transmission of a pressing force to the second movable component 2*a* is canceled, the second deformable component 2*b* is released from deformation and contracts. A state in which the transmission of a pressing force to the second movable component 2*a* is canceled includes, though depending on use applications of the switch power generating mechanism 1, a state in which a user ceases to push the second movable component 2*a* or a state in which an object is removed and a pressing force therefrom is lost.

When the transmission of the pressing force to the second movable component 2*a* is canceled, the retention of the deformation due to the elongation of the second deformable component 2*b* is released, and the second deformable component 2*b* is released from deformation to cause a contraction therein. Even during the contraction, the connecting portion with the box 4 serves as a fixed end, and the hole of the protrusion p serves as a moving end. Thus, due to the contraction of the second deformable component 2*b*, the second movable component 2*a* rotates by a predetermined amount in a reverse direction (in the example, rotation in a counterclockwise direction, see FIGS. 3A, B and FIGS. 4A, B).

When the second movable component 2*a* rotates by a predetermined amount in the reverse direction, the teeth of the first and the second movable components 1*a* and 2*a* re-engage and interlock with each other, and the first movable component 1*a* rotates in the reverse direction. The rotation amount of the first movable component 1*a* in the reverse direction depends on the rotation amount of the second movable component 2*a* by a predetermined amount in the reverse direction, that is, the deformation of the second deformable component 2*b* by a predetermined amount. Thus, the positional energy accumulated in the second deformable component 2*b* due to the elongation is converted by the contraction into rotation of the first movable component 1*a* by a predetermined amount in the reverse direction, and the first movable component 1*a* rotates by a predetermined amount in the reverse direction (in the example, rotation of about 90° in the clockwise direction, see FIGS. 3A, B and FIGS. 4A, B).

With the rotation of the first movable component 1*a* by a predetermined amount in the reverse direction, the holder 5 also interlocks with the first movable component 1*a*, and the position of the hole at the end of the holder 5 also rotates by a predetermined amount in the reverse direction to move by about 90°. As the central axis c2 serves as a fixed end and the hole at the end of the holder 5 moves, the first deformable component 1*b* elongates only by a predetermined amount to deform again. With the engagement among the teeth of the first and the second movable components 1*a* and 2*a*, the elongation of the first deformable component 1*b* is accumulated in the first deformable component 1*b* as a positional energy due to an elastic force.

With this rotation of the first movable component 1*a* by a predetermined amount in the reverse direction, the first bevel gear 1*c* also rotates only by a predetermined amount in the reverse direction, and the second bevel gear 2*c* also interlocks to rotate. A shaft rotates only by a predetermined amount, and electricity is generated inside the generator 3 for power generation.

A rotation amount of a shaft changes according to the rotation of the first movable component 1*a* by a predetermined amount in the reverse direction, that is, a maximum value of the elongation of the second deformable component 2*b*. Therefore, a maximum value of the elongation of the second deformable component 2*b* can be set to an arbitrary predetermined amount depending on the rotation amount of the second movable component 2*a* (amount by which the second movable component 2*a* is pushed with a force) according to an amount of transmitting a force (pressing force) from outside the switch power generating mechanism 1. Thus, the rotation amount of the shaft 6 can also be set to an arbitrary predetermined amount, and therefore, the amount of power generation by the generator 3 can also be set at a constant value irrespective of a speed of an external force (pressing force) transmitted to the second movable component 2*a*.

As described above, the switch power generating mechanism 1 makes it possible, by including the second deformable component 2*b*, to generate power by the generator 3 by accumulating a deformation amount of the second deformable component 2*b* to a predetermined amount and then releasing the deformation. Thus, even if the second movable component 2*a* is pushed with a force (pressing force) applied at a slow speed to operate the switch power generating mechanism 1, a constant amount of power generation can be ensured, and a reliable switching operation can be performed.

Further, the second deformable component 2*b* is released from deformation by canceling the transmission of a pressing force to the second movable component 2*a*. In other words, even when the second movable component 2*a* is not pushed, the switch power generating mechanism 1 can secure a constant amount of power generation. Thus, since it is possible to increase an operating state capable of self-power generation, a more reliable switching operation can be realized, and use applications of the switch power generating mechanism 1 can be expanded.

Furthermore, after the first movable component 1*a* rotates by a predetermined amount in the reverse direction, the engagement among the teeth of the first and the second movable components 1*a* and 2*a* is released again (see FIGS. 4A, B), and the first deformable component 1*b* is released from deformation to cause a contraction. The central axis c2 serves as a fixed end, and the hole at the end of the holder 5 moves. Therefore, when the first deformable component 1*b* contracts, the first movable component 1*a* interlocks to rotate by a predetermined amount (about 90°) in a direction opposite to the reverse direction, that is, in the counterclockwise direction (see FIGS. 1A, B). Thus, the positional energy accumulated in the first deformable component 1*b* due to the elongation is converted by the contraction into rotation of the first movable component 1*a* by a predetermined amount in the counterclockwise direction.

With the rotation of the first movable component 1*a* by a predetermined amount in the counterclockwise direction, the first bevel gear 1*c* also rotates only by a predetermined amount in the counterclockwise direction, and the second bevel gear 2*c* also interlocks to rotate. The shaft 6 rotates only by a predetermined amount, and electricity is generated inside the generator 3 for power generation.

The rotation amount of the shaft 6 changes according to the rotation of the first movable component 1*a* by a predetermined amount in the counterclockwise direction, that is, a maximum value of the elongation of the first deformable component 1*b*. Therefore, a maximum value of the elongation of the first deformable component 1*b* can be set to an arbitrary predetermined amount according to an arc length of a pitch circle where the teeth of the first and the second movable components 1*a* and 2*a* engage with each other.

Thus, the rotation amount of the shaft 6 can also be set to an arbitrary predetermined amount, and therefore, the amount of power generation by the generator 3 can also be set to a constant value irrespective of a speed of an external pressing force transmitted to the second movable component 2a.

As described above, the switch power generating mechanism 1 makes it possible, by including the first deformable component 1b, to generate power by the generator 3 by accumulating a deformation amount of the first deformable component 1b to a predetermined amount and then releasing the deformation. Thus, even if the second movable component 2a is pushed with a force applied at a slow speed to operate the switch power generating mechanism 1, a constant amount of power generation can be secured, and a reliable switching operation can be performed.

Further, the first deformable component 1b is released from deformation due to the re-engagement among the teeth of the first and the second movable components 1a and 2a by canceling the transmission of the pressing force to the second movable component 2a. In other words, even when the second movable component 2a is not pushed, the switch power generating mechanism 1 can secure a constant amount of power generation. Thus, since it is possible to increase an operating state capable of self-power generation, a more reliable switching operation can be realized, and use applications of the switch power generating mechanism 1 can be expanded. Then, it returns to an initial state in FIG. 1A from FIG. 4A.

Figure 4A:
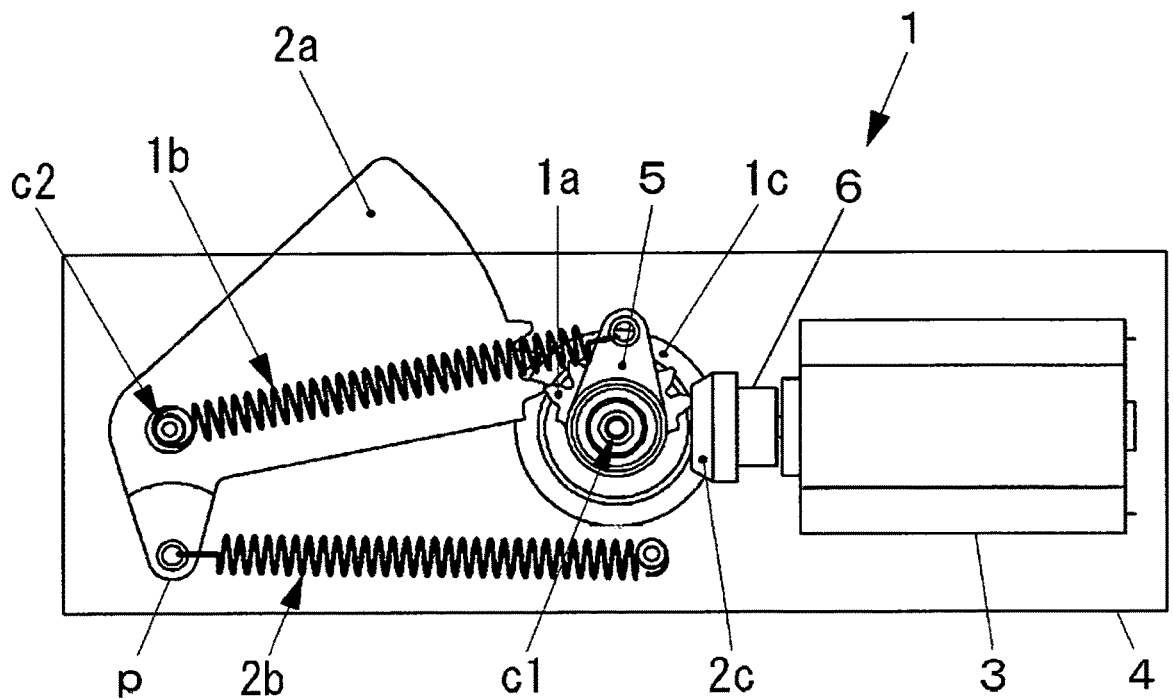
FIG. 4A is a schematic diagram that illustrates a state in which an external force of the switch power generating mechanism is eliminated and the second deformable component is released from deformation in the switch power generating mechanism according to the example of the present invention.
Figure 4B:
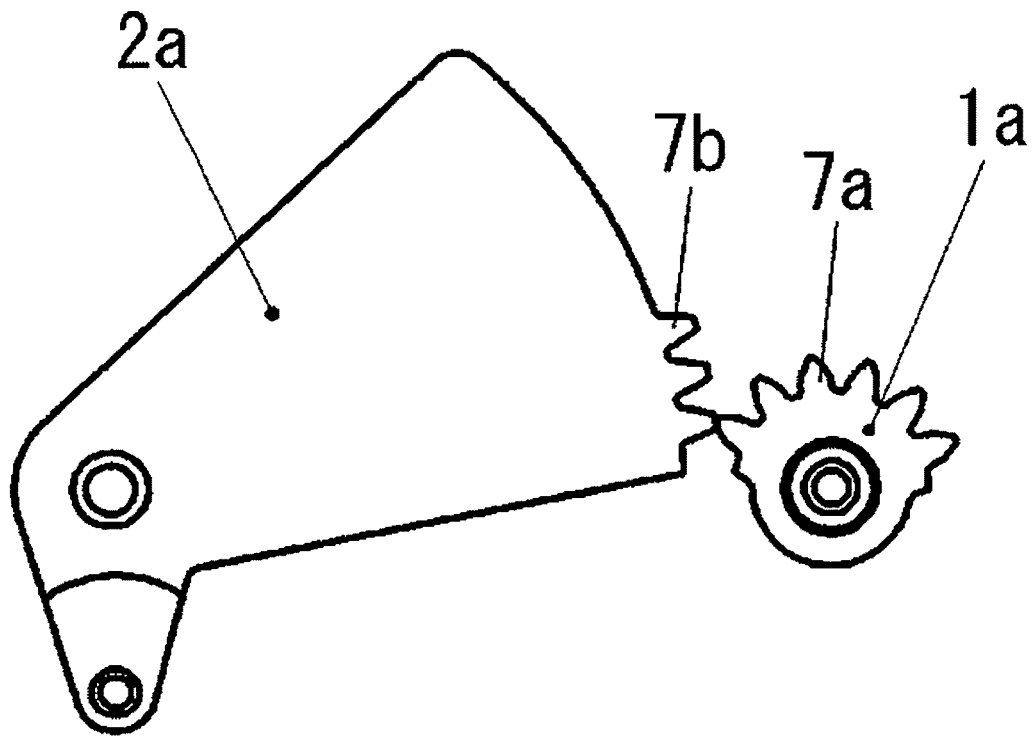
FIG. 4B is a schematic diagram that illustrates only the first and the second movable components extracted from FIG. 4A.

In the example of FIGS. 1A, B to FIGS. 4A, B, the embodiment in which the connecting position at one end of the first deformable component 1b is set to the central axis c2 of the second movable component 2a is described. However, for example, the connecting position at one end of the first deformable component 1b can be changed to an arbitrary part within the switch power generating mechanism 1 such as the box 4.

In the example, a pulley or a magnet gear may be used instead of a gear. However, a slip loss may occur with a pulley, and an operation loss may occur with a magnet gear. On the other hand, by using gears as components for forming a switch power generating mechanism, it is possible to engage their teeth with each other to operate the switch power generating mechanism. Thus, since it is possible to suppress or prevent occurrence of an operation loss, it is possible to reliably ensure a constant amount of power generation in any usage condition and perform a reliable switching operation, which is preferred.

Furthermore, in the present embodiment, the switch power generating mechanism 1 includes only simple components such as a gear, a coil-shaped spring, and a generator. Thus, it is possible to form a switch power generating mechanism excellent in weather resistance and reliability and capable of reliably ensuring a constant amount of power generation in any usage condition and performing a reliable switching operation.

In addition, by housing the components forming the switch power generating mechanism 1, excluding a part of the second movable component 2a, in the box 4, dustproofness and waterproofness of a transmission part between the first and the second movable components 1a and 2a can be secured. A rust preventive effect of a gear part can also be obtained. Thus, the weather resistance and reliability of the switch power generating mechanism 1 can be further improved, and a more reliable switching operation can be realized.

REFERENCE SIGNS LIST 1 switch power generating mechanism
1a first movable component
1b first deformable component
1c first bevel gear
2a second movable component
2b second deformable component
2c second bevel gear
3 generator
4 box
5 holder
6 shaft
7a teeth
7b teeth
c1, c2 central axis
p protrusion

The invention claimed is:

1. A switch power generating mechanism comprising:
a first movable component;
a second movable component that rotates by a predetermined amount by transmission of a force from outside, the first movable component being rotated by a predetermined amount by rotation of the second movable component;
a first deformable component that deforms by a predetermined amount by rotation of the first movable component and is released from deformation when the first movable component rotates by a predetermined amount;
a rotation transmission mechanism that transmits rotation of the first movable component; and
a generator that generates electricity for power generation by the transmitted rotation of the first movable component through the rotation transmission mechanism,
wherein the first and second movable components are arranged such that when the first movable component is rotated in one direction by the second movable component for the predetermined amount while the first deformable component is being deformed, the first movable component is disengaged from the second movable component to rotate in a reverse direction opposite to the one direction by the first deformable component, the rotation transmission mechanism transferring rotation of the first movable component to the generator to generate electricity.

2. The switch power generating mechanism according to claim 1, further comprising:
a second deformable component that is connected to the second movable component, deforms by a predetermined amount when the second movable component rotates by the predetermined amount by transmission of the force from outside, and is released from deformation by canceling the transmission of the force, wherein
the second movable component rotates by a predetermined amount in a reverse direction by release from deformation of the second deformable component;
the first movable component rotates by a predetermined amount in the reverse direction by the rotation of the second movable component;
the first deformable component deforms by a predetermined amount by the rotation of the first movable component by a predetermined amount in the reverse direction and is released from deformation when the first movable component rotates in the reverse direction by a predetermined amount;
the rotation transmission mechanism transmits rotation of the first movable component in the reverse direction, and transmits rotation when the first movable component rotates by a predetermined amount in a direction opposite to the reverse direction by release from the deformation of the first deformable component; and the generator generates electricity for power generation by transmitting each of the rotations of the first movable component.

3. The switch power generating mechanism according to claim 2, wherein the first movable component is a gear having teeth on a part of a periphery thereof, and the second movable component is a sector gear having teeth on a part of a periphery thereof, the sector gear of the second movable component engaging the gear of the first component when the second movable component is rotated for the predetermined amount and then disengaging from the gear of the first movable component to allow the first movable component to rotate freely in the reverse direction by the first deformable component.

4. The switch power generating mechanism according to claim 3, wherein after the first movable component rotates in the reverse direction, when the second movable component is released from the force from the outside, the second movable component rotates in the reverse direction by the second deformable component and engages again the first movable component to further rotate the first movable component in the reverse direction to generate electricity, and then, when the second movable component is disengaged from the first movable component after further rotation of the second movable component, the first movable component rotates in the one direction again to generate electricity.

5. The switch power generating mechanism according to claim 3, wherein the first movable component is connected to the generator such that when the first movable component is rotated by the second movable component in the one direction, the generator is rotated through the rotation transmission mechanism to generate electricity.

6. The switch power generating mechanism according to claim 1, further comprising a box housing components forming the switch power generating mechanism, excluding a part of the second movable component, wherein the part of the second movable component projects from the box.

7. A switch power generating method using a switch power generating mechanism including: a first movable component, a second movable component, a first deformable component connected to the first movable component, and a generator, the method comprising:

transmitting a force from outside the switch power generating mechanism to the second movable component, wherein at least parts of the first and the second movable components interlock with each other, to thereby rotate the first movable component in one direction by a predetermined amount, and deform the first deformable component by a predetermined amount, disengaging the first movable component from the second movable component, to thereby release the first deformable component from deformation, after the first movable component rotates in the one direction by a predetermined amount, and rotating the first movable component in a reverse direction opposite to the one direction by a predetermined amount by release from deformation of the first deformable component, to thereby transmit the rotation of the first movable component to the generator to cause the generator to generate electricity for power generation.

8. The switch power generating method according to claim 7, wherein the switch power generating mechanism further includes a second deformable component connected to the second movable component, the method further comprising:

deforming, when the second movable component moves by the predetermined amount by the force, the second deformable component by a predetermined amount, releasing deformation of the second deformable component by canceling transmission of the force after the first movable component rotates by a predetermined amount in the reverse direction, deforming the first deformable component again by a predetermined amount, and releasing the first deformable component from deformation after the first movable component rotates by a predetermined amount in the reverse direction, and rotating the first movable component in a direction opposite to the reverse direction by release from the deformation of the first deformable component, wherein the rotation of the first movable component by a predetermined amount in the reverse direction is transmitted to the generator to cause the generator to generate electricity for power generation, and the rotation of the first movable component by a predetermined amount in a direction opposite to the reverse direction is transmitted to the generator to cause the generator to generate electricity for power generation.

9. A switch power generating method using a switch power generating mechanism including: a first movable component, a second movable component, a first deformable component connected to the first movable component, and a generator, wherein the first movable component is a gear with teeth formed on at least a part of a periphery of a transmission wheel and is pivotally and rotatably supported around a central axis, the second movable component is a sector gear with teeth formed on at least a part of a periphery of a fan-shaped transmission wheel and is pivotally and rotatably supported around a central axis, the first deformable component is a coil-shaped spring with one end connected to the central axis of the second movable component and another end connected to a part excluding a center of the first movable component, the second deformable component is also a coil-shaped spring and is housed in a box with one end connected to a part excluding a center of the second movable component and another end connected to the box, a first bevel gear is pivotally supported on the central axis of the first movable component and pivotally and rotatably supported in connection with the first movable component, and a second bevel gear is fixed to a shaft of the generator, and the first and the second bevel gears are connected to engage their teeth with each other, wherein a force is transmitted from outside the switch power generating mechanism to the second movable component, at least parts of the first and the second movable components interlock with each other, the first movable component rotates by a predetermined amount, and the first deformable component deforms by amount, the first deformable component is released from deformation after the first movable component rotates by a predetermined amount, the first movable component rotates by a predetermined amount by release from deformation, and this rotation of the first movable component by a predetermined amount is transmitted to the generator to cause the generator to generate electricity for power generation, the force is transmitted to the second movable component to cause the second movable component to rotate by the predetermined amount to move, a part excluding the center also moves by a predetermined amount, the second deformable component elongates by the predetermined amount to deform, and a positional energy due to an elastic force is accumulated in the second deformable component and retained by the force, the teeth of the first and the second movable components engage and interlock with each other, the first movable component rotates by the predetermined amount, a part excluding the center also rotates by a predetermined amount, the first deformable component elongates by the predetermined amount to deform, and a positional energy due to an elastic force is accumulated and retained in the first deformable component by the engagement among the teeth of the first and the second movable components, the engagement among the teeth of the first and the second movable components is released after the first movable component rotates by the predetermined amount, the first deformable component is released from deformation to cause a contraction, the first movable component rotates by a predetermined amount in a reverse direction, the first bevel gear also rotates, the second bevel gear interlocks to rotate, and the shaft rotates to cause the generator to generate electricity for power generation, the second deformable component is released from deformation by canceling the transmission of the force to cause a contraction, the second movable component rotates by a predetermined amount in a reverse direction, the teeth of the first and the second movable components engage and interlock with each other, the first movable component rotates by the predetermined amount in the reverse direction, the part excluding the center also rotates by a predetermined amount in the reverse direction, the first deformable component elongates by a predetermined amount to deform, a positional energy due to an elastic force is accumulated in the first deformable component, the first bevel gear also rotates, the second bevel gear interlocks to rotate, and the shaft rotates to cause the generator to generate electricity for power generation, and furthermore, the engagement among the teeth of the first and the second movable components is released after the first movable component rotates by the predetermined amount in the reverse direction, the first deformable component is released from deformation to cause a contraction, the first movable component rotates by a predetermined amount, the first bevel gear also rotates and the second bevel gear interlocks to rotate, and the shaft rotates to cause the generator to generate electricity for power generation.

* * * * *